UNITED STATES PATENT OFFICE.

JAKOB SCHMID, OF BASLE, SWITZERLAND, ASSIGNOR TO THE SOCIETY OF CHEMICAL INDUSTRY, OF SAME PLACE.

ORTHONITROPARADIAMIDO-DIPHENYL.

SPECIFICATION forming part of Letters Patent No. 425,525, dated April 15, 1890.

Application filed December 3, 1889. Serial No. 332,459. (Specimens.)

*To all whom it may concern:*

Be it known that I, JAKOB SCHMID, a citizen of Switzerland, residing at Basle, Switzerland, have invented new and useful Improvements in the Production of Orthonitroparadiamido-Diphenyl, which may be usefully employed as material in the production of coloring-matters, of which the following is a specification.

This invention relates to the production of orthonitroparadiamido-diphenyl, $\begin{array}{l}C_6H_3-NH_2\\ \phantom{C_6H_3}-NO_2.\\ C_6H_4-NH_2\end{array}$ The following example shows my method of proceeding: Six kilograms of dry sulphate of benzidine are dissolved in sixty kilograms of sulphuric acid of 66° Baumé. This solution when cooled with the aid of ice below 5° centigrade is nitrated by slowly adding a mixture of 1.60 kilogram nitric acid of ninety-two percent. and five kilograms of concentrated sulphuric acid. The mixture is left alone for five hours and then run into ice-water. By addition of soda the obtained nitro product separates in form of an orange-red mass. For purification the latter is extracted with hot diluted sulphuric acid. The filtered solution is precipitated by a soda solution and the precipitate is washed and dried. Orthonitroparadiamido-diphenyl, $\begin{array}{l}C_6H_3-NH_2\\ \phantom{C_6H_3}-NO_2,\\ C_6H_4-NH_2\end{array}$ is easily soluble in alcohol, in ether, and in hot benzine. It dissolves with difficulty in hot water, from which it precipitates in orange-yellow small tabular crystals, melting at from 141° to 142° centigrade. It dissolves easily in diluted muriatic acid and in hot diluted sulphuric acid. The sulphate of orthonitroparadiamido-diphenyl by its solubility in hot water shows a characteristical difference with the sulphate of benzidine, which is entirely insoluble. Nitrous acid converts it in a tetrazo combination, which is rather difficultly soluble, and which, together with aromatic amines and phenols, as well as with their sulphur acids and the carbonic-acid series, condenses into coloring-matters.

By reducing agents the orthonitroparadiamido-diphenyl is transformed in a triamido-diphenyl, which by its reactions corresponds entirely to the metaphenyldiamine. Therefore it can be employed as the starting-point for the production of a series of new coloring-matters.

Proceeding with sulphate of toluidine exactly in the same manner as above described, a new orthonitroparadiamido-ditolyl, melting-point 151° to 152°, is obtained—a product which in all its reactions is analogous to the derivative of benzidine.

Orthonitroparadiamido-diphenyl may be used for the production of coloring-matters.

What I claim as new and original, and desire to secure by Letters Patent, is—

The new product orthonitroparadiamido-diphenyl, which is easily soluble in alcohol, ether, and hot benzine, difficultly soluble in hot water, from which it precipitates in small tabular crystals of orange-red color and melting at from 141° to 142° centigrade.

In testimony whereof I have hereunto set my hand in the presence of two subscribing witnesses.

JAKOB SCHMID.

Witnesses:
GEORGE GIFFORD,
CHS. A. RICHTER.